United States Patent [19]
Hausfeld

[11] 3,899,925
[45] Aug. 19, 1975

[54] VALVE SYSTEM FOR CONFINED VORTEX FLOW SYSTEM

[75] Inventor: Brian A. Hausfeld, Dayton, Ohio

[73] Assignee: The United States of America as represented by the Secretary of the Air Force, Washington, D.C.

[22] Filed: Jan. 17, 1974

[21] Appl. No.: 434,154

[52] U.S. Cl. ............ 73/147; 73/422 TC; 137/604; 176/45
[51] Int. Cl. ..................... G01m 9/00; G01n 1/04
[58] Field of Search ........... 73/147, 432 R, 432 SD, 73/422 TC; 176/39, 45; 35/19 R

[56] References Cited
UNITED STATES PATENTS

| | | |
|---|---|---|
| 3,711,370 | 1/1973 | Von Ohain .......................... 176/45 |
| 3,730,834 | 5/1973 | Turman .............................. 176/45 |

Primary Examiner—Herbert Goldstein
Attorney, Agent, or Firm—Joseph E. Rusz; Richard J. Killoren

[57] ABSTRACT

A valve system, for use in a confined vortex flow system, having a hollow elongated tubular member positioned in a cylindrical chamber in one of the gas flow directing vanes in the vortex chamber. The tubular member has a notch in the wall extending substantially the entire length of the tubular member and forming a pair of lip members adapted to direct the particle flow into the chamber and to intercept particle flow to remove particles from the chamber. The tubular member has a surface extending the length of the vane and adapted to provide a smooth flow for the flow within the chamber.

3 Claims, 5 Drawing Figures

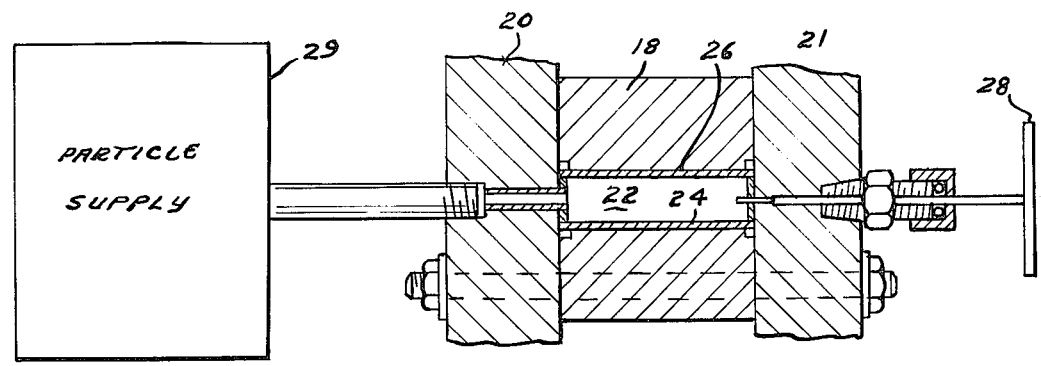
Fig-2
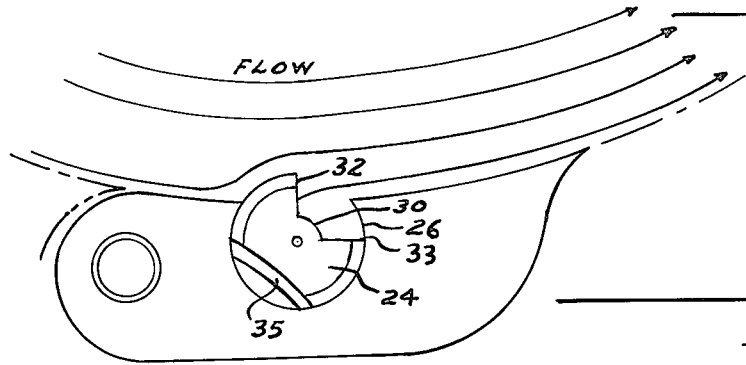
Fig-3 START UP
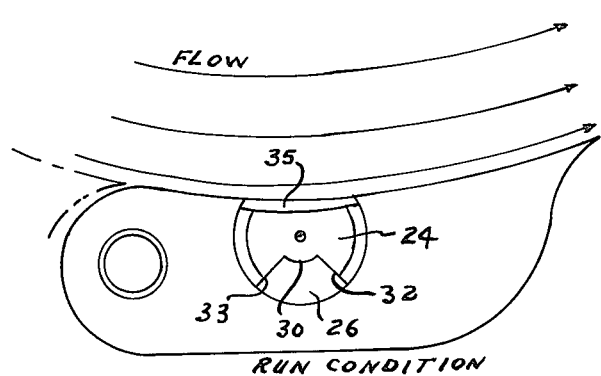
Fig-4 RUN CONDITION
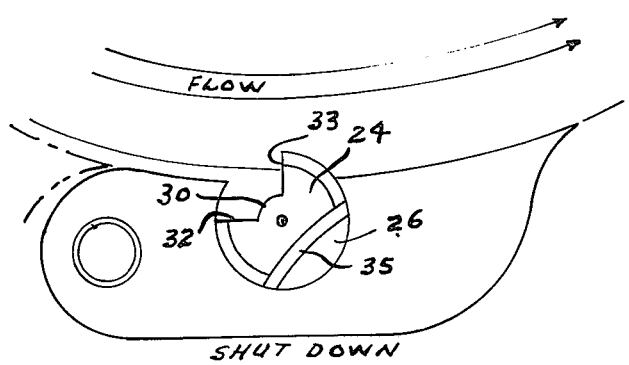
Fig-5 SHUT DOWN

VALVE SYSTEM FOR CONFINED VORTEX FLOW SYSTEM

BACKGROUND OF THE INVENTION

In the study of vortex flow in a confined vortex system, such as a colloidal core nuclear reactor prototype, an apparatus is needed for the rapid injection and removal of particles, parallel to the flow, while the system is in the run mode. The apparatus must be such that it will cause minimum flow perturbations in the vortex system.

BRIEF SUMMARY OF THE INVENTION

According to this invention, a three way valve system is provided in one of the gas injector control vanes of a confined vortex system. In the injection mode of the system, the valve has a lip which is turned to direct the particles in the direction of flow within the chamber. In the exhaust mode, the valve has a lip which is positioned to intercept the particles moving in the flow in the vortex chamber. In the run mode the valve is turned to provide a smooth contour with no protrusions into the flow.

IN THE DRAWING

FIG. 2 is a sectional view of the device of FIG. 1 along the line 2—2.

FIG. 3 shows an end view of the charging and discharging valve of the invention in its particle injection position.

FIG. 4 shows the device of FIG. 3 in the run position.

FIG. 5 shows the device of FIG. 3 in the exhaust position.

DETAILED DESCRIPTION OF THE INVENTION

Figure 1:
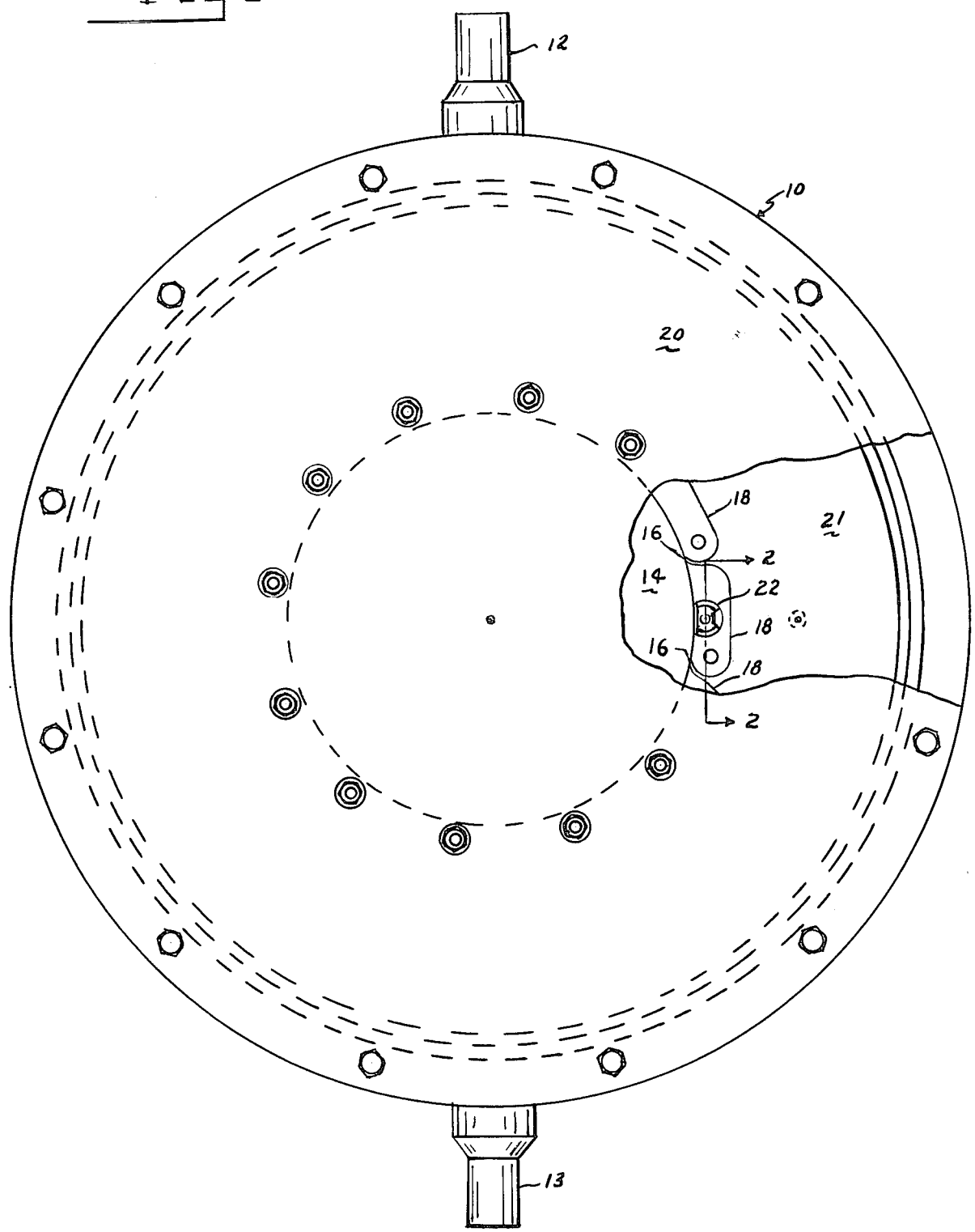
FIG. 1 is a partially cut away plan view of a colloidal core nuclear reactor prototype used with the device of the invention.

Reference is now made to FIG. 1 of the drawing which shows a colloidal core nuclear reactor prototype apparatus 10 used to study vortex flow in a confined chamber has hydrogen or other light weight gas supplied from inputs 12 and 13 to the chamber 14 through slots 16 between vanes 18 to provide a vortex flow within chamber 14. Side plate members 20 and 21 are transparent so that the vortex flow can be viewed. A nozzle, not shown, is positioned in the plate 21. Solid particles, such as talcum powder, is supplied to the chamber 14 through a supply valve 22 positioned in one of the vanes 18, shown in greater detail in FIGS. 2–5. The valve 22 consists of a tubular member 24 positioned within a circular slot 26 in one of the vanes 18. The tubular member 24 may be positioned by means of a control handle 28. Particles are supplied from particle supply 29 to the tubular member by means well known in the art such as by the use of a carrier gas such as hydrogen.

The tubular member 24 has a notched portion 30 through which the solid particles are supplied to and removed from the chamber 14. The notched portion forms lip portions 32 and 33 adapted to project into the chamber. The surface 35 is shaped to match the contour of the vane 18.

In the operation of the device, the valve is positioned with lip 32 projecting into chamber 14, as shown in FIG. 3. Gas in particle supply can then carry particles through notched portion 30 of valve 22 into chamber 14. During run operation, the valve is positioned as in FIG. 4 to provide a smooth contour to flow within chamber 14. At the end of the run, the valve is positioned as in FIG. 5 so that lip portion 33 will intercept the particle flow. The gas flow within chamber 14 will act to carry the particles back to supply 29. Though not shown, the supply 29 will normally include a centrifugal separator to separate the particles from the gas.

While the device has been described for use in supplying talcum powder to a vortex test chamber, it may also be used for supplying other materials to a vortex system, such as powdered metals or other fine solid particles. Also, in some systems using means other than vanes to provide the vortex flow, the valve may be located in an outer wall member.

There is thus provided a system for supplying and removing particles from a reactor prototype vortex system that will cause minimum flow perturbation in the vortex system.

I claim:

1. A three position valve system for use in a confined vortex flow system having a vortex chamber formed between a pair of wall members with means for forming a circumferential wall for said chamber and including means for providing a vortex flow of a low molecular weight gas in a flow path around the central axis of said chamber, comprising: a cylindrical shaped chamber in said circumferential wall and having an elongated opening on the side adjacent said vortex chamber; said cylindrical shaped chamber having its axis parallel to the axis of the vortex flow path within said chamber; a hollow elongated tubular member positioned within said cylindrical shaped chamber; said tubular member having a first means, in a first circumferential position of the valve, for directing particle flow into said vortex chamber in the direction of gas flow within the vortex chamber; said tubular member having a second means, in a second circumferential position of the valve, for intercepting the flow of particles within the vortex chamber to remove particles from the chamber; said tubular member having a third means, in a third circumferential position of the valve, adapted to be positioned adjacent said vortex chamber, for providing a smooth flow surface, for the gas flow within said vortex chamber; means for selectively positioning the valve in one of its three positions.

2. The device as recited in claim 1 wherein said means for forming the circumferential wall includes a plurality of flow control vanes positioned between the wall members; said means for providing a vortex flow within said vortex chamber includes means for directing a flow of low molecular weight gas between said vanes into the vortex chamber; said cylindrical shaped chamber and said tubular member being located in one of said flow control vanes.

3. The device as recited in claim 1 wherein said tubular member has a notch extending substantially the entire length of said tubular member; said means for directing particle flow into said vortex chamber including a first lip member, on one side of said notch, adapted to project into the vortex chamber; said means for intercepting the flow of particles including a second lip member on the other side of said notch, adapted to project into the vortex chamber.

* * * * *